(12) United States Patent
Shi et al.

(10) Patent No.: US 12,489,148 B2
(45) Date of Patent: Dec. 2, 2025

(54) HYBRID SOLID-STATE CELL WITH A 3D POROUS CATHODE STRUCTURE

(71) Applicant: Sakuu Corporation, San Jose, CA (US)

(72) Inventors: Steven Zhichao Shi, Santa Clara, CA (US); Philip Eugene Rogren, Half Moon Bay, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 18/737,839

(22) Filed: Jun. 7, 2024

(65) Prior Publication Data

US 2024/0332633 A1 Oct. 3, 2024

Related U.S. Application Data

(60) Continuation of application No. 18/339,868, filed on Jun. 22, 2023, now Pat. No. 12,034,126, which is a
(Continued)

(51) Int. Cl.
*H01M 10/0585* (2010.01)
*B29C 64/106* (2017.01)
(Continued)

(52) U.S. Cl.
CPC ....... *H01M 10/0585* (2013.01); *B29C 64/106* (2017.08); *B33Y 80/00* (2014.12); *H01M 4/0402* (2013.01); *H01M 4/0416* (2013.01); *H01M 4/0471* (2013.01); *H01M 4/13* (2013.01); *H01M 4/139* (2013.01); *H01M 4/62* (2013.01); *H01M 4/624* (2013.01); *H01M 4/625* (2013.01); *H01M 4/626* (2013.01); *H01M 4/64* (2013.01); *H01M 4/661* (2013.01); *H01M 4/663* (2013.01); *H01M 4/664* (2013.01); *H01M 4/666* (2013.01); *H01M 10/052* (2013.01); *H01M 10/0562* (2013.01); *H01M 50/117* (2021.01); *H01M 50/183* (2021.01); *H01M 50/30* (2021.01); *H01M 50/394* (2021.01); *H01M 2004/021* (2013.01); *H01M 2004/024* (2013.01);
(Continued)

(58) Field of Classification Search
None
See application file for complete search history.

(56) References Cited

U.S. PATENT DOCUMENTS 8,304,115 B1 * 11/2012 Petkov ............ H01M 10/0562
429/304

* cited by examiner

*Primary Examiner* — Jonathan Crepeau
(74) *Attorney, Agent, or Firm* — Arman Khosraviani

(57) ABSTRACT

An electrochemical cell is provided, which includes a cathode comprising a three dimensional (3D) porous cathode structure, an anode, an electrolyte separator, comprised of a ceramic material, located between the cathode and the anode, and a cathode current collector, wherein the cathode is located between the cathode current collector and the electrolyte separator. The 3D porous cathode structure includes ionically conducting electrolyte strands extending through the cathode from the cathode current collector to the electrolyte separator, pores extending through the cathode from the cathode current collector to the electrolyte separator, and an electronically conducting network extending on sidewall surfaces of the pores from the cathode current collector to the electrolyte separator.

20 Claims, 9 Drawing Sheets

Related U.S. Application Data continuation of application No. 17/983,047, filed on Nov. 8, 2022, now Pat. No. 11,728,517, which is a division of application No. 17/515,348, filed on Oct. 29, 2021, now Pat. No. 11,527,779, which is a continuation-in-part of application No. 17/179,719, filed on Feb. 19, 2021, now Pat. No. 11,165,101, which is a continuation of application No. 16/898,126, filed on Jun. 10, 2020, now Pat. No. 10,971,760, which is a continuation-in-part of application No. 16/702,417, filed on Dec. 3, 2019, now abandoned, which is a division of application No. 16/262,058, filed on Jan. 30, 2019, now Pat. No. 10,535,900.

(60) Provisional application No. 62/624,476, filed on Jan. 31, 2018.

(51) Int. Cl.
*B33Y 80/00* (2015.01)
*H01M 4/04* (2006.01)
*H01M 4/13* (2010.01)
*H01M 4/139* (2010.01)
*H01M 4/62* (2006.01)
*H01M 4/64* (2006.01)
*H01M 4/66* (2006.01)
*H01M 10/052* (2010.01)
*H01M 10/0562* (2010.01)
*H01M 50/112* (2021.01)
*H01M 50/117* (2021.01)
*H01M 50/183* (2021.01)
*H01M 50/30* (2021.01)
*H01M 4/02* (2006.01)

(52) U.S. Cl.
CPC .......... *H01M 4/043* (2013.01); *H01M 50/112* (2021.01); *H01M 2300/0068* (2013.01)

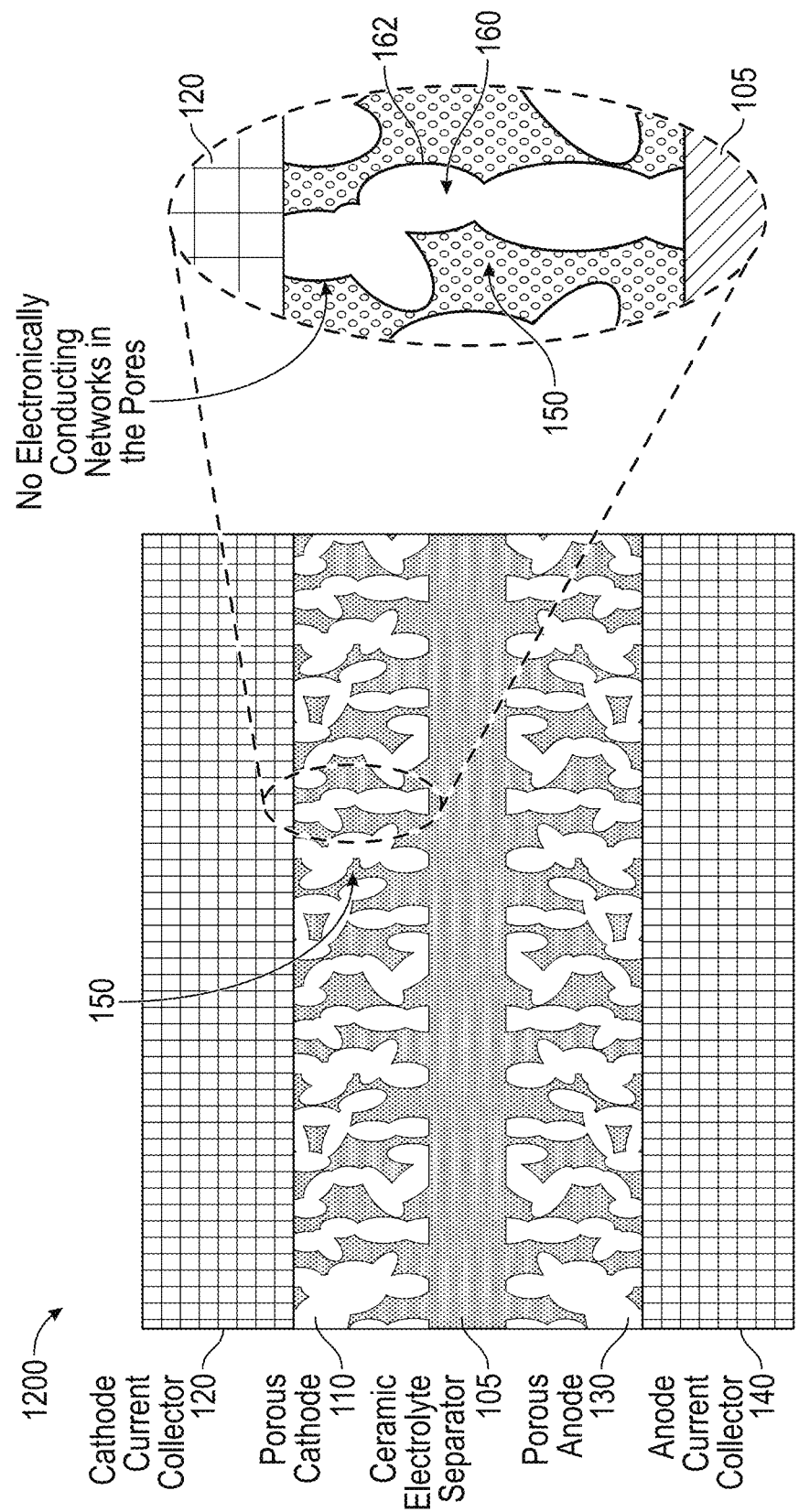

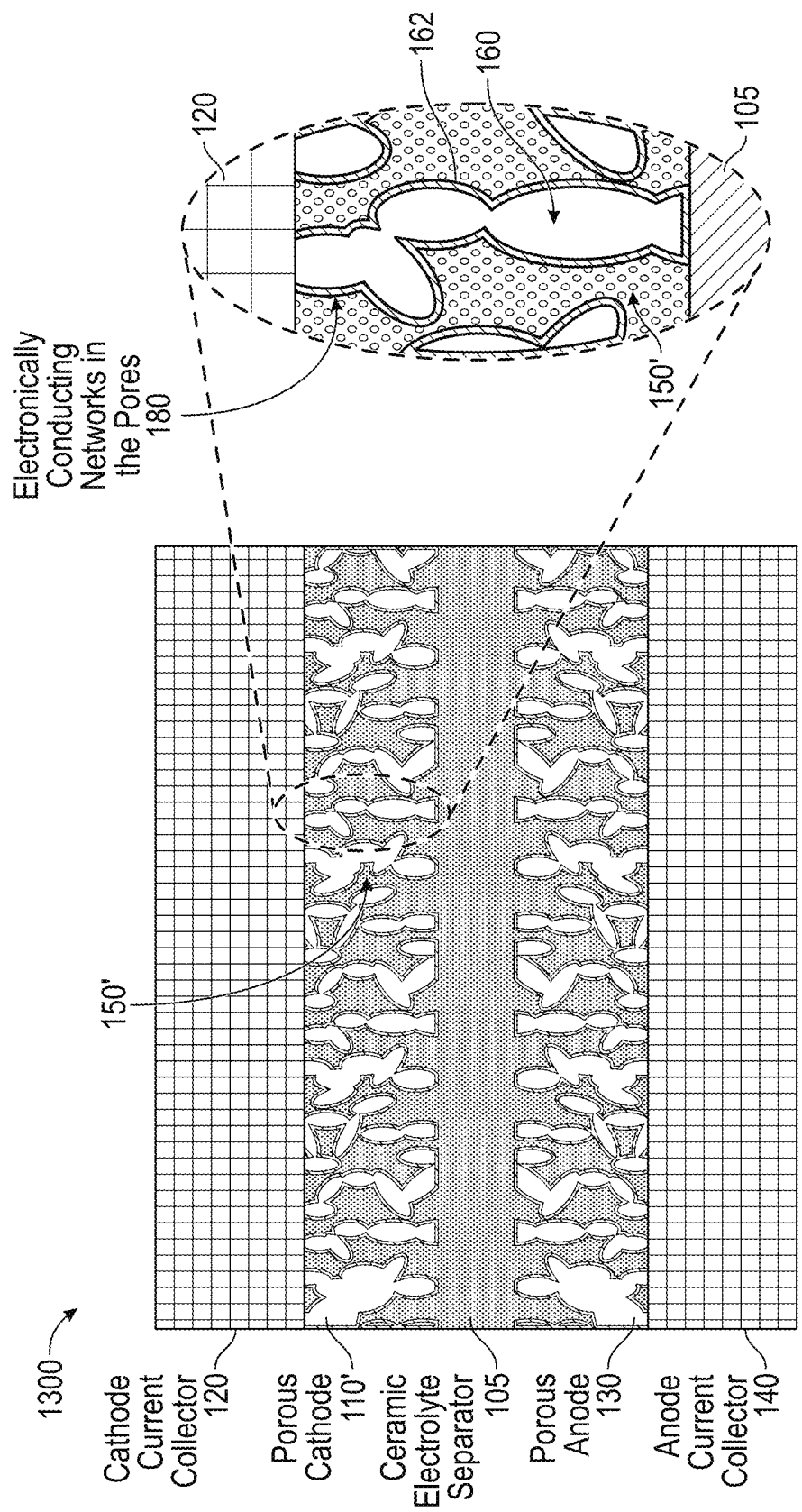

HYBRID SOLID-STATE CELL WITH A 3D POROUS CATHODE STRUCTURE

CROSS-REFERENCE TO RELATED APPLICATIONS

The present application is a continuation of U.S. patent application Ser. No. 18/339,868 entitled "Hybrid Solid-State Cell with a 3D Porous Cathode Structure," file on Jun. 22, 2023, which is a continuation of U.S. patent application Ser. No. 17/983,047 entitled "Hybrid Solid-State Cell with a 3D Porous Cathode Structure," file on Nov. 8, 2022, which is a divisional of U.S. patent application Ser. No. 17/515,348 entitled "Hybrid Solid-State Cell with a 3D Porous Cathode Structure," filed Oct. 29, 2021, which is a continuation-in-part of U.S. patent application Ser. No. 17/179,719 entitled "Hybrid Solid-State Cell with a Sealed Anode Structure," filed Feb. 19, 2021, which is a continuation application of U.S. patent application Ser. No. 16/898,126 entitled "Hybrid Solid-State Cell with a Sealed Anode Structure," filed Jun. 10, 2020, which is a continuation-in-part application of U.S. patent application Ser. No. 16/702,417 entitled "Hybrid Solid-State Cell with a Sealed Anode Structure," filed Dec. 3, 2019, which is a divisional application of U.S. patent application Ser. No. 16/262,058 entitled "Hybrid Solid-State Cell with a Sealed Anode Structure," filed Jan. 30, 2019, now U.S. Pat. No. 10,535,900, which claims priority to U.S. Provisional Application No. 62/624,476 entitled "HYBRID SOLID-STATE CELL", filed Jan. 31, 2018, the contents of which are incorporated by reference in its entirety.

The present application is also related to U.S. patent application Ser. No. 15/883,698, entitled "CERAMIC LITHIUM RETENTION DEVICE," filed Jan. 30, 2018, now U.S. Pat. No. 10,581,111, the content of which is hereby incorporated herein by reference in its entirety, and to an application Ser. No. 17/515,301 filed by the same inventor on n Oct. 29, 2022, entitled "HYBRID SOLID-STATE CELL WITH A 3D CATHODE STRUCTURE," now U.S. Pat. No. 11,489,206, the content of which is hereby incorporated herein by reference in its entirety.

TECHNICAL FIELD

The present application relates to solid state batteries, in particular, lithium-ion batteries, and a monolithic ceramic electrochemical cell housing for such batteries, and associated methods of manufacturing the electrochemical cell housing and related battery devices.

BACKGROUND

Lithium-ion batteries (LIBs) provide significant improvements in energy density and cost per watt hour compared to the nickel-cadmium battery and nickel-metal hydride batteries that preceded them. Notwithstanding, the manufacturing of a LIB is cost prohibitive in applications for electric vehicles. Furthermore, the low energy density causes the electronic gadgets to be larger and bulkier than desirable. Recent improvements in the field have attempted to address these drawbacks with solid state batteries to increase the energy density.

While battery cells with lithium metal anodes provide superior energy density, rechargeable cells cannot be constructed with lithium metal anodes because of the risk of dendrite formation during the charge cycle. The dendrite formation during the charge cycle results in short circuits that cause explosion and combustion during ignition of the liquid electrolyte. The liquid electrolyte is comprised of highly combustible organic solvents and can not prevent dendrite growth between the anode and cathode. As a result, LIBs are typically made up of intercalation anodes, which allow lithium ions to be inserted into the crystalline structure rather than being plated onto a current collector. Inserting the lithium ions into the crystalline structure reduces the effective energy storage capacity of the anode to less than 10% the theoretical capacity of lithium metal.

Liquid electrolyte also limits a maximum voltage for the battery. Typical liquid electrolytes decompose at cell voltage above four-volts between an anode and a cathode, which limits the maximum nominal voltage of a LIB cell to about 3.8-volts. Cathode materials that can produce 6 volts against a lithium anode are considered practical, but not usable in cells with liquid electrolyte. The ability to use such high voltage cathodes could increase the energy density of the cells by 50%.

An obvious solution is to use a nonflammable solid electrolyte that resists dendrite formation, is stable at cell voltage above 6 volts, and possesses ionic conductivities comparable to that of the liquid electrolytes. While ceramics with high lithium ion conductivities meet those requirements, they also have physical and chemical properties that prevent practical implementations. For example, ceramic materials are typically very rigid and brittle. Furthermore, a practical battery cell is made up of stacks of sub cells, each in turn includes very thin layers of the basic components of an electrochemical cell. Common approaches to constructing a cell include producing the thin layers (<40 μm for the separator) in sheets and assembling them in order. However, the thin layers are fragile and rarely flat, causing a discontinuous contact between individual layers across the meeting surfaces. Applying pressure to the stack of layers tends to improve the contact, but unacceptably increases the risk of fracturing a layer.

Moreover, applying pressure to the stack of layers fails to create an integrated connection between layers, rather it creates an array of point contacts between two surfaces. In some cases, the actual contact between adjacent sheets may be an order of magnitude less than the design area, resulting in an order of magnitude higher current density at the contact points, which exceeds the critical current density causing dendrite growth. Other drawbacks associated with a cell with lithium metal anode includes a difficulty in achieving a true hermetic seal around the anode space. Any oxygen or water ingress into the anode space will cause oxidation of the lithium, so a non-hermetic seal reduces the capacity and eventually destroys the cell as oxygen or water leaks into the cell. Although liquid electrolyte poses significant drawbacks, liquid electrolyte is able to flow into any open space where a lithium atom was oxidized to a lithium ion and moves across the separator to the cathode, to maintain the ionic conductivity throughout the cell. Ceramic electrolyte does not possess this ability. As a result, the conventional approach to using ceramic electrolyte is to create a planar interface between the lithium metal and the ceramic electrolyte. In this way, only a thin layer of lithium close to the ceramic electrolyte can oxidize and move into the electrolyte. The result is a very big limitation to the energy storage capacity of the anode. Thin film solid-state cells epitomize this drawback because the useable thickness of the lithium metal anode is only a fraction of the lithium metal deposited.

In addition, in battery structures, such as in a lithium-ion battery, the sluggishness of lithium ion and electron transport in the cathode results in high internal resistance which limits the battery rate performance. At high charge and discharge rates, the maximum achievable capacity of the battery falls sharply. Therefore, there is a need to improve the lithium ion and electron transport in the cathode structure.

One approach for improving the lithium ion and electron transport is to employ a three dimensional (3D) porous cathode structure comprising both electron-conducting and ion-conducting materials, i.e., a cathode structure which includes a large number of pores, each having a surface area, wherein the contact area between the cathode active material and the electron-conducting and lithium ion-conducting materials can be greatly increased by the presence of the additional surface area provided by the pores. For example, for a 3D porous cathode having 50 μm thickness and 60% porosity, the active area per 1 $cm^2$ geometric area of the cathode can be increased to 12 $cm^2$ and 120 $cm^2$ with pore diameter ranging from 10 μm to 1 μm, respectively. The large contact area greatly enhances the accessibility of electron-conducting and lithium ion-conducting pathways for the cathode active material, thus lowering internal resistance and improving the battery rate performance. However, full advantage of the 3D high surface area has not been realized with previous structures due to the lack of access of cathode active material to electron-conducting and ion-conducting networks. This leads to a relatively low cathode utilization efficiency, low capacity and low energy density for the battery.

Hence, there is a need to address the above-stated short comings of current solid-state cell development efforts.

SUMMARY

An electrochemical cell is provided which includes a cathode, an anode and a ceramic electrolyte separator, located between the cathode and the anode, and a cathode current collector, wherein the cathode is located between the cathode current collector and the electrolyte separator. The cathode comprises a three dimensional (3D) porous cathode structure including ionically conducting electrolyte strands extending through the cathode from the cathode current collector to the electrolyte separator, pores extending through the cathode from the cathode current collector to the electrolyte separator, and an electronically conducting network extending on sidewall surfaces of the pores from the cathode current collector to the electrolyte separator.

A method is provided for forming a 3D porous cathode structure for an electrochemical cell including a cathode, an anode, an electrolyte separator, comprised of a ceramic material, located between the cathode and anode, and a cathode current collector, wherein the cathode comprising the 3D porous cathode structure is located between the cathode current collector and the electrolyte separator. The method includes mixing a first precursor material, a second precursor material and a third precursor material together to form a mixture, depositing the mixture as a layer where the cathode is to be formed, and sintering the mixture to form the 3D porous cathode structure with ionically conducting electrolyte strands extending through the cathode from the cathode current collector to the electrolyte separator, pores extending through the cathode from the cathode current collector to the electrolyte separator, and an electronically conducting network extending on sidewall surfaces of the pores from the cathode current collector to the electrolyte separator. The second precursor material is a sacrificial material configured to decompose during formation of the pores in the solid electrolyte material by the sintering using the second precursor material, the first precursor material is a material which forms a coating of the electronically conducting network on the sidewall surfaces of the pores formed by sintering the second precursor material, and the third precursor material is a material that densifies the solid electrolyte material to form the ionically conducting electrolyte strands upon completion of formation of the pores.

A method for forming a 3D porous cathode structure for an electrochemical cell including a cathode, an anode, an electrolyte separator, comprised of a ceramic material, located between the cathode and anode, and a cathode current collector, wherein the cathode comprising a 3D porous cathode structure is located between the cathode current collector and the electrolyte separator. The method includes depositing the mixture of a powder of solid electrolyte material, a powder of a sacrificial pore forming material, and a powder of a precursor for densifying the solid electrolyte material as a layer where the cathode is to be formed, sintering the mixture to form the 3D porous cathode structure with the ionically conducting network in the 3D porous cathode structure, infusing an electronically conducting material into the 3D porous cathode structure after the sintering, to coat sidewall surfaces of the pores to form the electronically conducting network, and forming a cathode material in the pores after coating of the sidewall surfaces of the pores with the electronically conducting material, wherein the electronically conducting network is configured to conduct electrons from the cathode material.

In the above descriptions, and throughout the following disclosure, it is noted that the term "ionically conducting" refers to the ability of a material, for example, material forming the electrolyte strands, to readily conduct ions through the material. In other words, the material is an ionically conductive material or ion-conducting material. Similarly, the term "electronically conducting" refers to the ability of a material, for example, material forming the coatings on sidewall surfaces of the pores, to readily conduct electrons through the material. In other words, the material is an electronically conductive material or electron-conducting material.

Implementations disclosed herein include a monolithic ceramic electrochemical cell housing. The housing includes two or more electrochemical sub cell housings. Each of the electrochemical sub cell housings includes an anode receptive space, a cathode receptive space, an electrolyte separator between the anode receptive space and the cathode receptive space, and an anode sub-cell current collector and a cathode sub-cell current collector.

In some implementations, the anode receptive spaces are configured as hermetically sealed volumes, partially filled with strands of solid-state electrolyte material. The solid-state electrolyte material includes a high-density ceramic. The high-density ceramic can be selected from a group consisting of sulfides, borides, carbides, nitrides, phosphides, phosphates, oxides, selenides, fluorides, chlorides, bromides, iodides, or combinations thereof. The most useful materials include oxides, sulfides, phosphates, and nitrides. More specifically, preferred materials can be selected from a group consisting of garnet structure oxides including lithium lanthanum zirconium oxide (LLZO) and LLZO with various dopants including aluminum, niobium, gallium, tantalum, tungsten, phosphate glass ceramics such as lithium aluminum germanium phosphate (LAGP) and lithium aluminum titanium phosphate (LATP), sulfides such as thio-phosphate and argyrodite; and lithium phosphorus oxynitride (LiPON). The strands of solid-state electrolyte can form a network of continuous ionic conductivity between the separator and the anode current collector.

The strands of electrolyte can occupy between 20% and 80% volume of the anode receptive spaces. The anode current collector can serve as current collector for the anode receptive spaces of the electrochemical sub cell housing and second anode receptive spaces of a second adjacent electrochemical sub cell housing.

The cathode receptive spaces can be partially filled with strands of ceramic electrolyte material between 1% and 60% volume. In another implementation, the cathode receptive spaces can be devoid of ceramic electrolyte material. The monolithic ceramic electrochemical cell housing can also include insulating material between each of the electrochemical sub cell housing.

The cathode layer can include a seal structure in a filling aperture configured to contain catholyte. The catholyte material can be made up of cathode active material, an electrolyte for the charge transfer ion of the sub-cell, and an electron conducting material. The electron conducting material can include carbon, a metal or an electron conducting ceramic. The cathode active material can be made up of an intercalation host material suitable for the charge transfer ion. The seal structure can be configured to isolate the catholyte and provide pressure relief from the cathode receptive spaces. The anode receptive spaces can be filled with anode active material during an initial charging phase.

The anode receptive spaces can be sealed and the cathode receptive spaces can be partially sealed. The monolithic ceramic electrochemical cell housing can also include an anode electrical contact connecting anode sub-cell current collectors and a cathode electrical contact connecting cathode sub-cell current collectors.

A manufacturing method for assembling a monolithic ceramic electrochemical cell housing is also provided. The method can include depositing precursor materials in a flexible format to form a multi-layer structure. The method can also include heating the multi-layer structure to convert the precursors into a single monolithic structure void of physical interfaces between deposited layers. In some implementations, the format is fluid, selected from a group consisting of pastes, flowable powders and green tapes. In some implementations, the precursors are deposited using additive manufacturing techniques.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

FIG. 12A is a cross-section of a solid-state battery with a 3D porous cathode, according to various implementations, and FIGS. 12B and 12C are close-up views of an exemplary pore in the cathode.

FIG. 13A is a cross-section of a solid-state battery, according to various implementations, with a 3D porous cathode, FIG. 13B is a close-up view of an exemplary pore in the cathode with an electronically conducting network along sidewall surfaces of the pore in the cathode.

DETAILED DESCRIPTION

Figure 1:
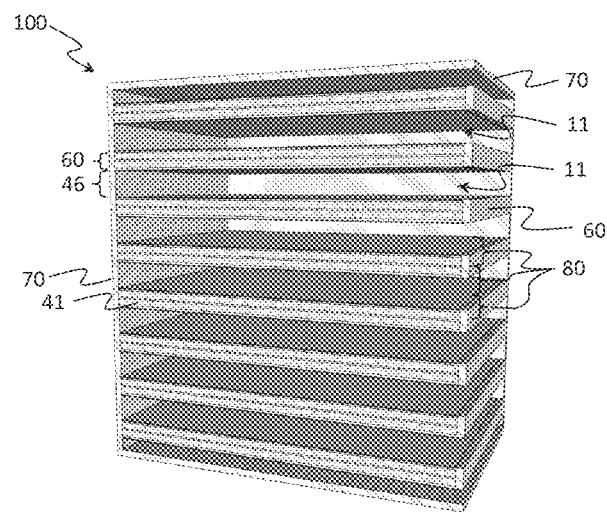
FIG. 1 illustrates an exemplary solid-state cell, in accordance with an implementation of the disclosure.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In view of the foregoing, implementations disclosed herein are directed to an apparatus and a manufacturing process for producing a ceramic electrochemical cell, and for forming an electrochemical cell, and, more specifically, a battery, such as a lithium-ion battery, from a monolithic ceramic electrochemical cell housing by adding a cathode material into a three dimensional (3D) porous cathode structure, and during a charging operation to form anode material, such as lithium, in an anode receptive space of the monolithic ceramic electrochemical cell housing. In the following disclosure and claims it is noted that, when reference is being made to an electrochemical cell or a battery, the term "cathode" is intended to include a state where the cathode material has not been added yet, and the term "anode" is intended to include a state where the electrochemical cell or battery is discharged, so that the anode is in a temporary state of being an anode receptive space waiting to be charged and filled with anode material.

Electrochemical cells and batteries comprising the monolithic ceramic electrochemical cell housings are produced at a per watt costs below current lithium-ion batteries (LIBs). The volumetric energy densities of the batteries are significantly higher than that of the current LIBs, and in capacities ranging from a few milliwatt hours to kilowatt hours. In some implementations, multi-material additive processes are incorporated to assemble the cells from precursors of the final materials, and convert the precursors to their final properties when the assembly is complete. These multi-material additive processes are implemented to eliminate the drawbacks of assembling cells from ceramic sheets with their final properties. The precursors can be in a fluid or plastically deformable sheet state, which can be layered and bonded together as precursors. The precursors in this state are also easy to handle and form into the desired configuration.

As a result, after the conversion to the final properties the resulting structure is a monolithic block with no discernable interface where adjacent layers were joined. The interface of the layers of dissimilar precursor materials is designed chemically and physically to optimize the conductivity between the two final materials. Specifically, a true chemical bond can be formed at the interface, avoiding the possibility of uncontrolled reactions with the environment or incomplete contact between materials which will compromise the desired properties of the interface. Conversion of the precursors in some implementations include heat treatment processes that remove organic material components of the precursors, convert the remaining constituents to the final desired chemistry, and sinter the final materials to their respective density targets.

The disclosed multi-material additive processes also produce a design that allows the ceramic electrolyte to maintain ionic conductivity completely across an electrode space regardless of the state of charge. For example, a porous structure of electrolyte can be created across an anode space, which forms a fully interconnected web of ionic conducting material from the solid electrolyte separator to the current collector of the electrode. The porous structure can be configured such that the distance between adjacent portions of the ionically conducting web is less than two-times the maximum distance an ion can be transferred from an anode active metal (e.g., lithium) into the ionically conducting electrolyte.

The disclosed multi-material additive processes also provide a cost-effective configuration of a hybrid cell design that incorporates a cathode with a similar composition to the typical cathodes employed in conventional lithium-ion cells, and an anode that it is a hermetically sealed space. Specifically, the anode can be bounded by the current collector on one side, the electrolyte separator on the opposite side, filled with the ionically conducting porous structure, and void of any intercalation host or active charge transfer species immediately following manufacture of the cell structure. The active charge transfer species (e.g., lithium) can be introduced to the anode receptive space by plating lithium from the cathode to the anode current collector during the conditioning, or first charging of the cell.

The present disclosure encompasses improved monolithic electrochemical cell housings, and includes lithium-ion battery devices, and, more specifically, relates to a lithium ion battery comprising a three dimensional (3D) porous cathode. The 3D porous cathode comprises both lithium ion-conducting and electron-conducting networks, which greatly enhance the accessibility of electron-conducting and lithium ion-conducting pathways for the cathode active material, thus lowering internal resistance and improving the battery rate performance. It is noted that, although the present description pertains primarily to the use of a monolithic electrochemical cell housing for forming a lithium-ion battery, the principles disclosed in the present disclosure are not limited to the formation of lithium-ion batteries, and can be used form forming batteries having different materials as well.

In various implementations, the electronically conducting networks formed on sidewalls of pores in the 3D porous cathode may be formed during formation of the pores themselves, using precursor materials to form the electronically conducting networks, or may be incorporated on sidewalls of pores in the porous cathode after the porous cathode structure is formed. In the latter case, the receptor for forming the 3D porous cathode may have at least one side open without a sealed wall. The opening allows infusion of the electronically conducting materials into the porous structure of a cathode receptor space. In some implementations, carbon may be infused to form electronically conducting networks, where a thin layer of carbon is coated at the surface of the pores. The carbon may be introduced from a carbon dispersion or a hydrocarbon precursor. The carbon can be selected from a group consisting of carbon black, activated carbon, graphite, graphene, carbon fiber, and carbon nanotubes. In other implementations, aluminum may be infused to form the electronically conducting networks, where a thin layer of aluminum may be coated at the surface of the pores. The aluminum may be introduced from, e.g., an organometallic precursor, or via chemical vapor deposition (CVD), atomic layer deposition (ALD) and electroless plating. In other implementations, silver may be infused to form the electronically conducting networks, where a thin layer of silver may be coated at the surface of the pores. The silver may be introduced from, e.g., an organometallic precursor, or via chemical vapor deposition (CVD), atomic layer deposition (ALD) and electroless plating. In other implementations, nickel may be infused to form the electronically conducting networks, where a thin layer of nickel may be coated at the surface of the pores. The nickel may be introduced from, e.g., an organometallic precursor, or via chemical vapor deposition (CVD), atomic layer deposition (ALD) and electroless plating. In a preferred implementation, the electronically conducting networks are formed from precursors incorporated in the precursor materials used to create the 3D porous cathode structure. It is noted that similar processes can be used to form a porous anode structure also having electronically conducting networks formed by electronically conducting coatings on sidewalls of pores formed in the porous anode. For example, precursors of electronically conducting materials are transformed into electronically conducting coating on the surface of the pores when the pores are formed during sintering of a structure made with the anode precursor materials.

Figure 2:
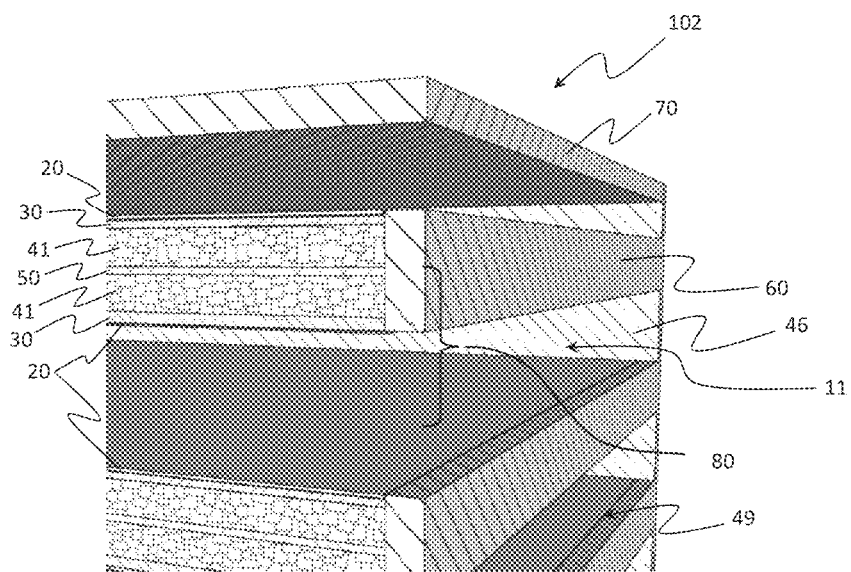
FIG. 2 illustrates an integrated framework of the exemplary solid-state cell of FIG. 1, in accordance with an implementation of the disclosure.

FIG. 1 illustrates an exemplary solid-state cell 100 in accordance with an implementation of the disclosure. The general structure of the solid-state cell 100 can include a monolithic and highly integrated framework 102, as illustrated in FIG. 2. The integrated framework 102 can include one to thousands of stacked sub cell housings 80.

Referring to FIG. 2, each sub-cell housing 80, with alternating thin layers, can include an anode receptive space 41 and a cathode receptive space 11. The anode receptive space 41 and cathode receptive space 11 can be separated by a thin separator 30, which may be made up of solid-state electrolyte. Each anode receptive space 41 can be made up of a hermetically sealed, defined volume, partially filled with strands of solid-state electrolyte material (shown in FIG. 3 as 32).

Figure 3:
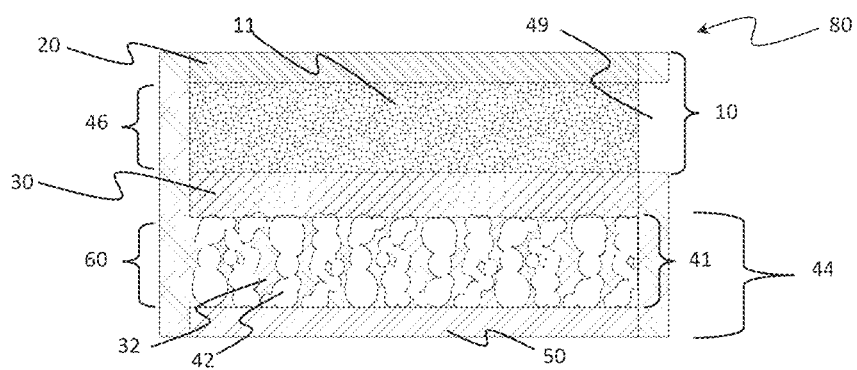
FIG. 3 illustrates a sub-cell housing, in accordance with an implementation of the disclosure.

Referring to FIG. 3, the hermetically sealed, defined volume, partially filled with strands of solid-state electrolyte material 32 form a region of controlled porosity (referred to herein as the "empty space 42"). The solid-state electrolyte material 32 can include a high-density ceramic. For the purposes of this example, the high-density ceramic can include, but is not limited to, sulfides, borides, carbides, nitrides, phosphides, phosphates, oxides, selenides, fluorides, chlorides, bromides, iodides, or combinations of thereof. The most useful materials include oxides, sulfides, phosphates, and nitrides. More specifically, preferred materials can be selected from a group consisting of garnet structure oxides including lithium lanthanum zirconium oxide (LLZO) and LLZO with various dopants including aluminum, niobium, gallium, tantalum, and tungsten, phosphate glass ceramics such as lithium aluminum germanium phosphate (LAGP) and lithium aluminum titanium phosphate (LATP); sulfides such as thiophosphate and argyrodite; and lithium phosphorus oxynitride (LiPON). The high-density ceramic can include any ceramic that exhibits room temperature conductivities of the intended charge transfer ion of the specific battery design, greater than $1\times10^{-6}$ S/cm. In some implementations, the charge transfer ion is $Li^+$. In alternative implementations, the charge transfer ion can be chosen from the group including $Na^+$, $Mg^{+2}$, $K^+$, and $Al^{+3}$.

The strands of solid-state electrolyte 32 can form a network of continuous ionic conductivity between the separator 30 and the anode current collector 50. The porous electrolyte structure can be made from solid-state electrolyte material, similar to the separator 30, but with a controlled structure. Continuous strands of electrolyte can be surrounded by the empty space 42 and extend from the separator 30 to the current collector 50. The empty space 42 can also extend from the separator 30 to the anode current collector 50. In some implementations, the strands of electrolyte can occupy between 20% and 80% of the volume of the anode receptive space 41 (also shown in FIG. 2) while the void space occupies the remaining volume. In some implementations, the porous structure is designed such that the average distance between adjacent strands of electrolyte material can be between 1 μm and 40 μm. Referring back to FIG. 2, the anode receptive spaces 41 for two adjacent sub cell housings 80 can be juxtaposed, separated by the current collector 50. The current collector 50 can serve as current collector for both anode receptive spaces 41 of the two adjacent sub cell housings 80.

Each cathode receptive space 11 can also be a defined volume partially filled with strands of ceramic material. In some implementations, the cathode receptive space 11 can form a region of controlled porosity. In other implementations, the cathode receptive space 11 can be an open defined volume free of any ceramic material. In some implementations, strands of electrolyte material in the cathode receptive space 11 can occupy from 0% to 60% of the total volume. Furthermore, the strands of electrolyte material can be designed such that the average distance between adjacent strands of electrolyte material can be between 0.02 mm and 200 mm.

The strands of ceramic material can include solid state electrolyte material that provides ionic conductivity across the thickness of the cathode space similar to the porous structure in the anode receptive space 41. Alternatively, the ceramic strands can be provided as mechanical elements to control the precise thickness of the cathode receptive space 11.

In some implementations, the cathode receptive spaces 11 of two adjacent sub cell housings 80 can be configured such that one cathode receptive space serves said two adjacent sub cell housings 80. Referring momentarily to the cathode current collectors 20 in FIG. 2 and FIG. 11. Each of the two adjacent sub cells can be configured with an electron conducting layer directly on the cathode side of the separators 30. The cathode receptive space 11 (shown in FIG. 11) of the two sub cell housings can be bounded on either side by cathode current collectors 20 of the two adjacent cell housings. The distance between the separators 30 of the two adjacent sub cell housings can be calculated to create a cathode receptive space 11 volume that includes an amount of catholyte that meets the design parameters of the two adjacent sub cells.

Figure 11:
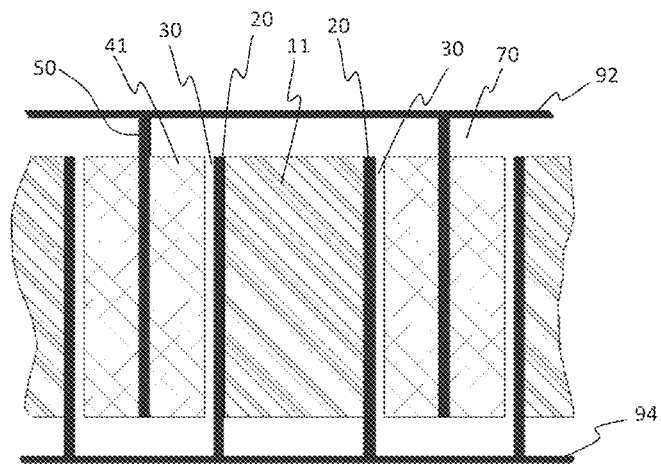
FIG. 11 illustrates a cell schematic of the exemplary solid-state cell of FIG. 1, in accordance with an implementation of the disclosure.

With reference to FIGS. 2 and 11, a cathode current collector 20 of a sub-cell 80 may be positioned in direct contact with a surface of a sub-cell separator 30, opposite the surface defining one surface of the sub-cell anode receptive space 41, thus defining one boundary of cathode receptive space 11. Two adjacent sub-cells 80 may be juxtaposed in contact, cathode receptive space 11 to cathode receptive space 11, with current collectors for each of the two cathode receptive spaces 11 positioned in contact with the cathode side of the separator 30 of the respective sub-cell 80. The resulting cathode receptive space 11 may thus be a volume sufficient to contain cathode material for two sub-cells 80. The advantages of this arrangement are that two very thin current collectors 20 supported on a separator 30 can occupy less volume than a single unsupported current collector positioned to separate two cathode receptive spaces 11. Secondly, positioning the current collectors at the periphery of a cathode receptive space creates a single double thick cathode receptive space, facilitating easier insertion of the cathode material into the cathode receptive space 11.

The cathode current collectors 20 may be comprised of a metal or a metal alloy or a conductive ceramic, or a conductive carbon-based material. Cathode current collectors 20 may be further comprised of an ion conducting material chosen to conduct the intended charge transfer ion of the specific battery design. The ion conducting material of the cathode current collectors 20 may be the same solid-state electrolyte as the electrolyte comprising the anode receptive space 41 and the separator 30. In one implementation, the ion conducting material is lithium lanthanum zirconium oxide. The metal or metal alloy or conductive ceramic or conducting carbon-based material of the cathode current collectors 20 may comprise a porous film that forms an electronic percolating network through the plane of cathode current collector 20. The metal or metal alloy or conductive ceramic or conducting carbon based material of the cathode current collectors 20 may comprise any value or values between 20% and 99% by volume of the cathode current collector 20. In some implementations, a current collector 20 may be present on only one side of cathode receptive space 11.

Figure 9:
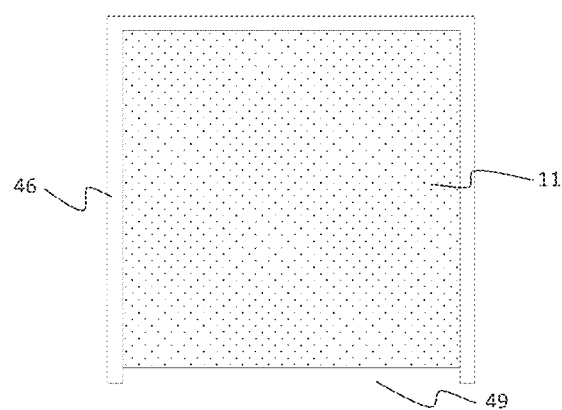
FIG. 9 illustrates a cathode layer of the exemplary solid-state cell of FIG. 1, in accordance with an implementation of the disclosure.

Referring back to FIG. 2, the cathode receptive space 11 can be further defined by low porosity ceramic walls 46 extending between the separators 30 to create a seal between the separators 30. The ceramic walls (shown in FIG. 9 as 46) can extend around at least 60% of the periphery of the cathode receptive space 11. The low porosity ceramic can be made up of solid-state electrolyte.

Figure 7:
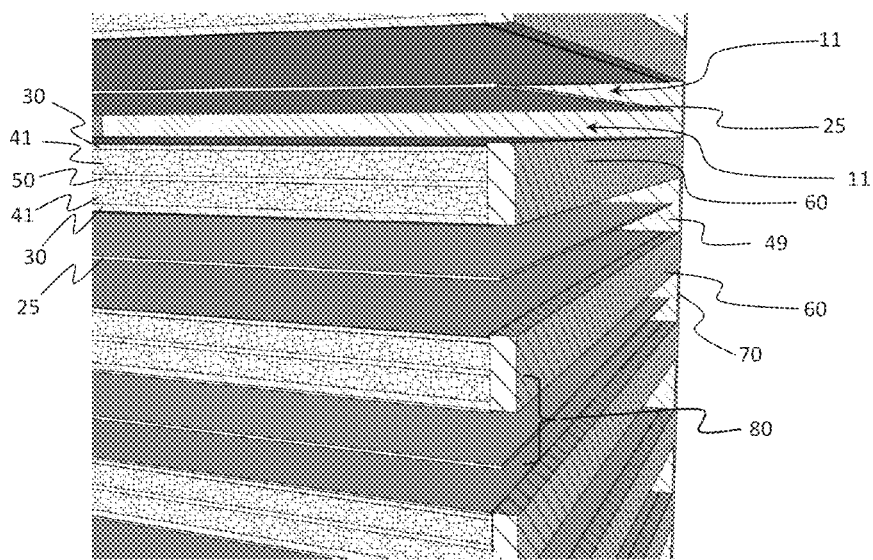
FIG. 7 illustrates an alternate integrated framework of the exemplary solid-state cell of FIG. 1, in accordance with an implementation of the disclosure.

With reference to FIG. 3, in some implementations, each sub-cell housing 80 can be separated from surrounding sub-cell housings 80 by layers of insulating material 25 (shown in FIG. 7). The insulating material can be disposed between the separators of adjacent sub cell housings, at a calculated distance. The distance can be calculated to create cathode receptive space 11 volume and anode receptive space 41 volume to contain an amount of catholyte and charge transfer species. The amount of catholyte and charge transfer species are designed to meet the configuration parameters of the sub-cell 80. In these implementations, current collectors can be disposed on the surfaces of the layer of insulating material 25 or anywhere within the cathode receptive space 11.

Figure 8:
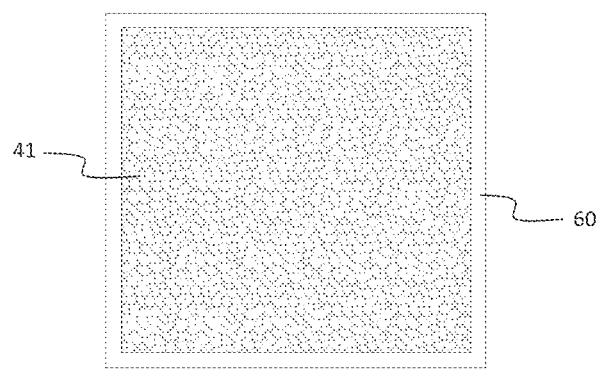
FIG. 8 illustrates an anode layer of the exemplary solid-state cell of FIG. 1, in accordance with an implementation of the disclosure.

FIG. 3 illustrates a sub-cell housing 80, in accordance with an implementation of the disclosure. Each sub-cell housing 80 is a layered structure, which can include solid-state electrolyte with alternating layers of high density electrolyte material. The sub-cell housing 80 also can include layers with a high degree of controlled porosity. The layers include anode layers 44, cathode layers 10, and separator layers 30. The anode and cathode layers can be made up of high porosity while the separator layers can be made up of high density electrolyte. The anode layers 44 can include anode receptive spaces 41, low porosity boarders 60 (Shown in FIG. 8), and anode current collectors 50. The cathode layers 10 can be made up of cathode receptive space 11, low porosity boarder 46 and a filling aperture 49 (shown in FIG. 9). The low porosity border 46 can be made up of high density ceramic material. In some implementations, the high density ceramic material can include solid-state electrolyte. The low porosity border 60 completely and hermetically seals the anode receptive spaces 41 from the environment. The low porosity border 46 can also partially surround the cathode receptive spaces 11, physically isolating the cathode receptive space from other layers in the sub-cell housing.

Referring back to FIG. 3, the separators 30 are configured to separate the anode receptive space 41 of each sub-cell housing from the cathode receptive space 11 of each sub-cell to eliminate contact between the spaces. The separator layer 30 can be configured with a precise thickness to ensure it is void of open pores. In a preferred implementation, the thickness of the separator layer can be range between 0.00001 mm to 1.0 mm. The thickness of the anode receptive space 41 and cathode receptive space 11 can be configured to optimize the performance of the specific materials. The configuration of the open volume and the solid-state ionically conducting electrolyte strands are also designed to optimize the performance of the specific materials.

As indicated above, the cathode layers 10 can include cathode receptive space 11 partially or completely filled with catholyte. The low porosity ceramic walls can be positioned around at least a portion of the cathode receptive space 11 and the cathode current collectors 20 within the cathode receptive space.

The cathode layer 10 can also include a seal structure in a filling aperture 49 (shown in FIG. 2 and FIG. 9) configured to contain the catholyte. The seal structure can be configured to protect the catholyte from the environment and provide pressure relief from the cathode receptive space 11. The separator layer 30 can include electrically insulated ceramic material. In some implementations, at least a central portion of the electrically insulated ceramic material includes solid-state electrolyte appropriate for the design charge transfer species of the sub-cell. The low porosity ceramic walls can also include solid-state electrolyte material and serve as protective packaging for the sub-cell.

In a preferred implementation, the multilayered structure of anode receptive space 41, the cathode receptive space 11, the separators 30 and the current collectors 50 and 20 can be assembled without either catholyte or anode active materials present. The catholyte material can be inserted through the filling aperture 49 (shown in FIG. 2 and FIG. 9) and sealed in place in the cathode layer 10. The catholyte material can be made up of cathode active material, an electrolyte for the charge transfer ion of the sub-cell, and an electron conducting material. The electron conducting material can include carbon, a metal or an electron conducting ceramic. The cathode active material can be made up of an intercalation host material suitable for the charge transfer ion.

Figure 4:
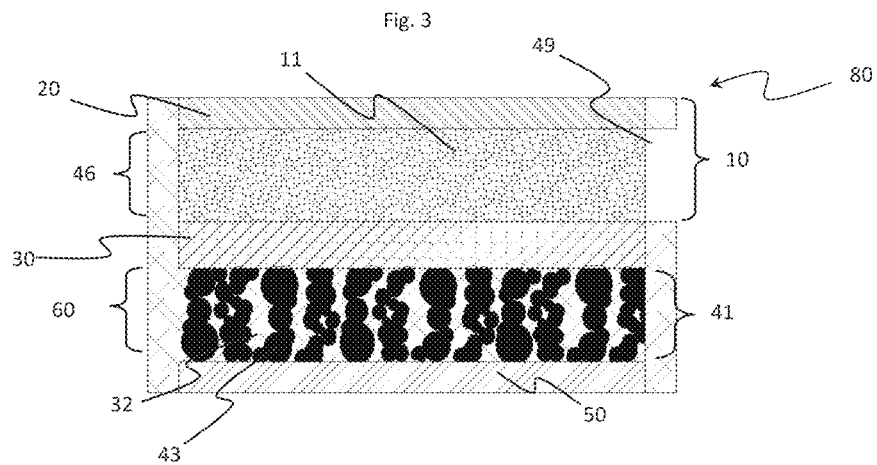
FIG. 4 illustrates a sub-cell housing, in accordance with an implementation of the disclosure.
Figure 5:
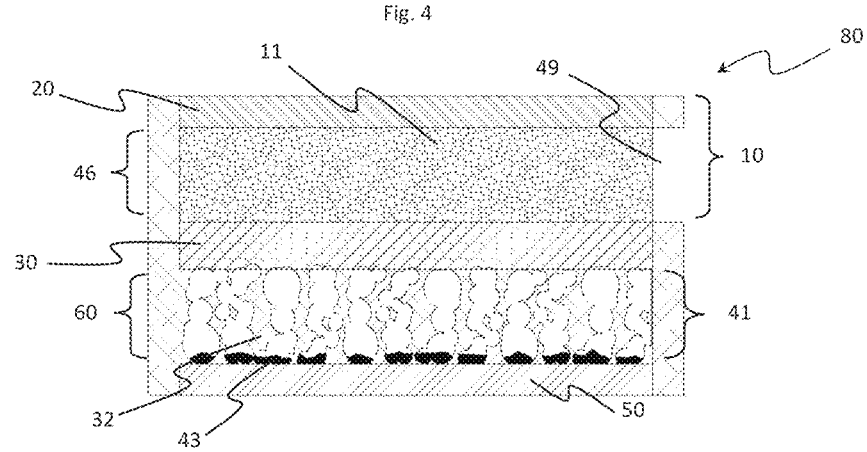
FIG. 5 illustrates a sub-cell housing, in accordance with an implementation of the disclosure.

Referring specifically to FIG. 5, the empty space 42 of the porous anode receptive space 41 can be partially filled or completely filled with anode active material 43 during the initial charging of the battery. In some implementations, the anode active material 43 can include lithium metal. The anode active material can be electroplated onto the anode current collector to initiate the filling of the anode receptive space 41. The anode active material can then be electroplated onto the previously plated anode active material until the anode receptive space 41 fills with the anode active material 43, as illustrated by FIG. 4.

The catholyte material can be inserted in the cathode receptive space 10 by converting the catholyte material to a fluid and drawing the fluid material into the porous structure under vacuum force. In some implementations, converting the catholyte materials to a fluid can include melting the catholyte materials, compounding the catholyte materials into a mixture of solid and liquid materials, dissolving the catholyte materials in a solvent, or converting the catholyte materials to a fine powder. In an alternative implementation, the catholyte material can be configured as solid or semi solid structure. The structure can be shaped to precisely fit the cathode receptive spaces. In this implementation, the catholyte material structures can directly inserted and secured in the respective cathode receptive spaces.

The sub-cell can be configured to enable the introduction of the catholyte material into the cathode receptive spaces, without damaging the rest of the structure. For example, the sub-cell can be configured such that all cathode receptive spaces are sealed continuously along at least three quarters of the edges of the sheet like volume, by low porosity ceramic walls 46. In some implementations, the cathode receptive spaces are open from over $1/1,000$ to $1/2$ of the total circumference. In some implementations, the cathode receptive spaces are open at a first location of the stack of cell layers. The first location enables the filling aperture of the cathode receptive spaces to be immersed into a fluid catholyte material. In some implementations, the filling aperture can be fully immersed in the fluid catholyte material.

Figure 10:
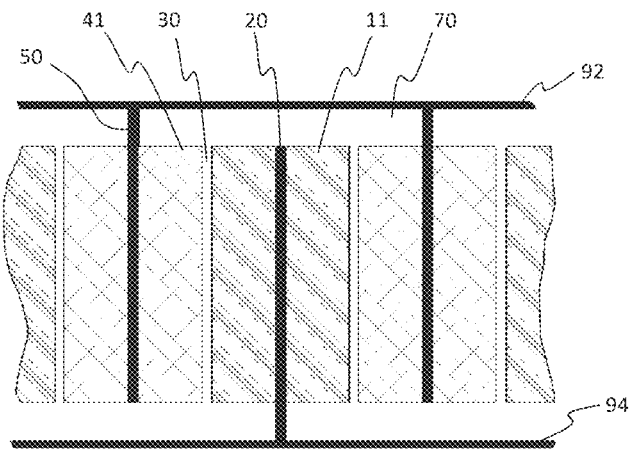
FIG. 10 illustrates a cell schematic of the exemplary solid-state cell of FIG. 1, in accordance with an implementation of the disclosure.

Further, as illustrated in FIG. 10 and FIG. 11, the sub-cell includes an anode electrical contact 92, connecting all of the anode sub cell current collectors. The anode electrical contact can include an extension for making electrical contact on the outside of the sub-cell. The sub-cell also includes a cathode electrical contact 94, connecting all of the cathode sub cell current collectors. The cathode electrical contact can also include an extension accessible for making electrical contact on the outside of the sub-cell.

In some implementations, the electrolyte structure is the basic framework and exoskeleton of the solid-state cell 100 (FIG. 1). A continuous electrolyte is required within the anode structure to transport lithium ions to and from electron conducting sites. The solid-state electrolyte can also serve as the separator 30 between anode and cathode regions, as a fully dense ceramic structure preventing growth of lithium dendrites during a cell charging cycle. In the anode and cathode regions, the electrolyte can form a porous structure that emulates a liquid electrolyte, allowing ion transfer throughout the three-dimensional space regardless of the state of charge. The electrolyte structure can seal the edges of the electrode regions, effectively completing a package around the sub-cell. The result is a structure of alternating dense and porous layers, integrated as a continuous structure throughout the cell with no apparent discontinuity at the interface of layers of similar material. At interfaces of chemically dissimilar materials, properties of the dissimilar materials are configured such that the only discontinuity at such interfaces is in the chemical composition of the interfacing layers.

In some implementations, assembly of the solid-state cell structure is accomplished by sequential deposition of layers or partial layers. The deposition of layers or partial layers can be patterned appropriately for the function of the individual layers, as precursors of the desired final materials. The precursors include mixtures of materials that form end materials of desired high density and electrochemical properties after a heat treatment. The binding materials can be separate materials from those that form the desired end material. In this case, the binding materials are removed from the structure during the heat-treating process. In other implementations, the binding materials can form the desired end material and have binding properties.

Figure 6:
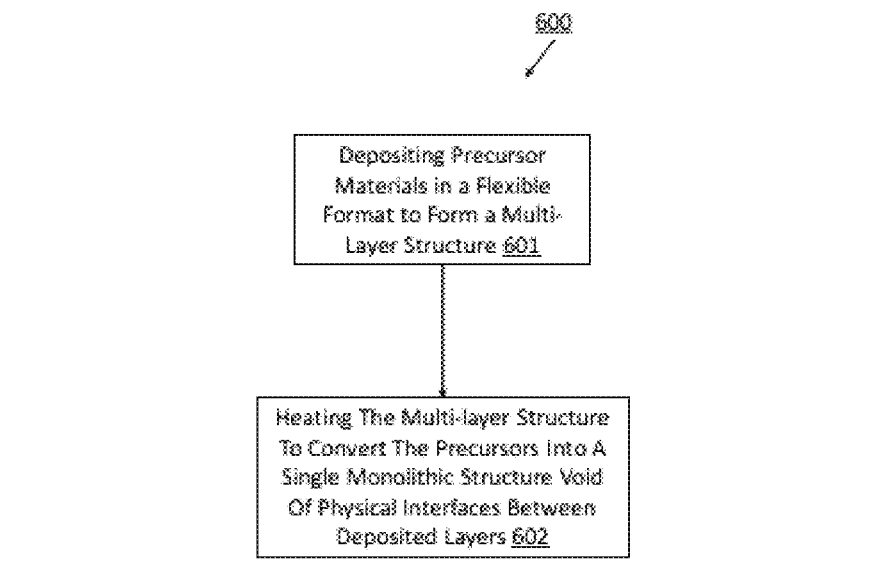
FIG. 6 is a flow chart illustrating manufacturing method of a sub-cell housing, in accordance with an implementation of the disclosure.

FIG. 6 is a flow chart illustrating the manufacturing process of a sub-cell housing. At step 601, the precursor materials are deposited in formats which are highly flexible and not brittle. For example, the precursor materials can be deposited as a fluid, including sheets which are easily plastically deformed without sacrificing the integrity of the sheet. The fluids can include pastes, flowable powders and green tapes. It should be understood that the precursors can be deposited in one format or a combination of two or more formats. After all the layers of the cell structure are deposited, the completed structure can be heat treated to convert the precursors to end materials of the desired physical and electrochemical properties at Step 602. Furthermore, the heat treatment creates a single monolithic structure with no physical interfaces between the deposited layers.

In some implementations, the precursors can be deposited using additive manufacturing techniques. For example, the precursors can be deposited using a three-dimensional (3D) printer accompanied by a computer system and guided by CAD data for each layer of the structure. In alternative implementations, the precursors can be deposited as layers of green (unfired) tape, prepared to the desired patterns, stacked in the design order and laminated together. In alternative implementations, both 3D printing and laminated tape deposition processes can be incorporated to form the complete structure.

In some implementations, although the cathode contains organic liquid electrolyte, the overall volume of liquid in the solid-state cell is about 10% of that in a standard LIB. This reduction of liquid greatly reduces the explosion and fire potential of the solid-state cell 100 compared to a standard LIB.

FIG. 12A is a cross-section of a solid-state battery 1200, according to various implementations of the present disclosure. In FIG. 12A, the solid-state battery 1200 includes a 3D porous cathode structure 110 that includes strands of solid-state electrolyte 150, as well as pores 160 (shown in FIG. 12B). The solid-state battery 1200 also includes a cathode current collector 120, connected to the 3D porous cathode structure 110, and a ceramic electrolyte separator 105 separating the cathode structure 110 from the anode structure 130. In some implementations, the electrolyte separator 105, and/or strands of solid-state electrolyte 150 of the cathode structure 110, may be, or may include lithium lanthanum zirconium oxide (LLZO). It is noted that the term "cathode structure" is intended to include the 3D structure shown, for example, in FIGS. 12A and 12B, before any cathode material is added in the pores.

FIG. 12B is an enlarged view of an exemplary one of the pores 160 shown in FIG. 12A. In particular, FIG. 12B shows one of the pores 160 having sidewalls 162 which are not coated with any electronically conducting networks. Regarding this, the sidewalls 162 of the pores 160 are formed by edges of the ionically conducting electrolyte strands 150 that abut the pores 160 which extend between the ionically conducting electrolyte separator 105 and cathode current collector 120 in the cathode structure 110. Although the drawings show the pores 160 extending only vertically through the cathode structure 110, it is to be understood that portions of the pores 160 can extend horizontally through the cathode structure 110 as well, connecting the vertical portions of the pores 160 shown in FIG. 12A to form a porous 3D cathode structure 110 having pores extending in both vertical and horizontal directions.

Figure 12C:
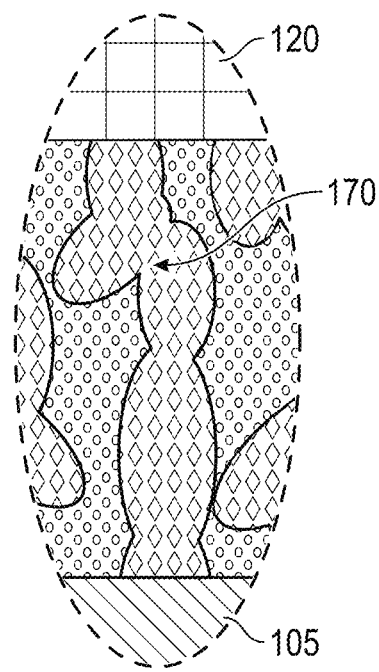
Figure 12D:
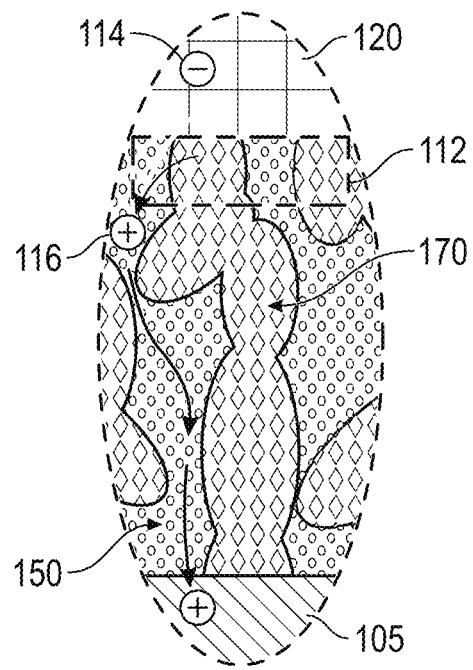
FIG. 12D is a close-up view of an exemplary pore in the cathode, showing electron and ion conduction without an electronically conducting network.

In the arrangement shown in FIG. 12A and FIG. 12B, there are no electronically conducting networks in the pores 160. More specifically, as illustrated in FIG. 12A, the porous cathode structure 110 is partially filled with solid electrolyte strands 150 extending from the solid electrolyte separator 105 to the cathode current collector 120. Each pore 160 is electronically connected only to the cathode current collector 120. When a cathode active material 170 is introduced in the pores, as shown in FIG. 12C, the cathode material 170 in each pore 160 is electronically connected only to the cathode current collector 120. In other words, only the portion of cathode active material 170 adjacent to the cathode current collector 120, illustrated as the area 112 in FIG. 12D, is highly effective with regard to accessibility to electron-conducting and lithium ion-conducting pathways. The addition of electronically conducting networks on the sidewalls of the pores, as discussed below, greatly improves the overall electron-conducting capabilities of the cathode.

More specifically, still referring to FIG. 12D, during charging, lithium ions such as 116 are released from the cathode active material 170 adjacent to the cathode current collector 120 in the region 112. These ions 116 move through the solid electrolyte strands 150 toward the solid electrolyte separator 105 and, from there, transfer further to the anode 130. Simultaneously, electrons, such as 114, are also released from the cathode active material 170, transferring to the cathode current collector 120, and, from there further to the anode current collector 140 and the anode 130 through an external circuit (not shown). Most of the cathode active material 170 away from the cathode current collector 120 is not functioning due to the lack of simultaneous access to electron-conducting and ion-conducting networks. This leads to a low cathode utilization efficiency, low capacity and low energy density for the battery 1200. In other words, the advantages of the high surface area 3D porous cathode 110 in the battery 1200 shown in FIG. 12A have not been fully realized.

Figure 13C:
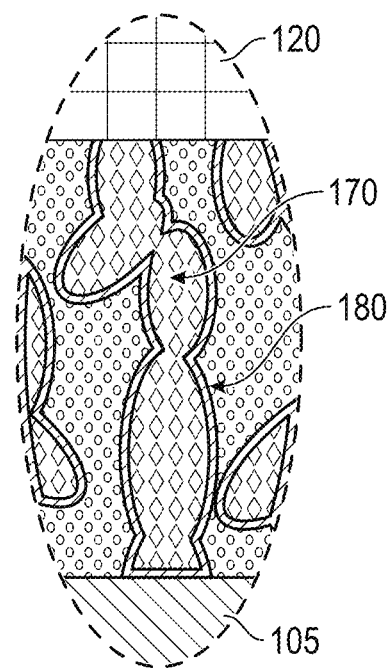
FIG. 13C is a close-up view of an exemplary pore in the cathode with cathode active material formed over the electronically conducting network along sidewall surfaces of the pore in the cathode.

As shown in FIGS. 13A-13D, the present disclosure presents a 3D porous cathode structure 110' consisting of both electronically conducting networks 180 and enhanced ionically conducting networks in the solid electrolyte strands 150', which provide effective access for the cathode active material 170 to electron-conducting and lithium ion-conducting pathways. As will be discussed below, this decreases internal resistance and increases the battery charge and discharge rates for the battery 1300 shown in FIG. 13A, compared to the battery 1200 shown in FIG. 12A, which does not include such electronically conducting and enhanced ion conducting networks. Accordingly, in accordance with implementations of this disclosure, in FIGS. 13A-13D electronically conducting networks 180 are incorporated on the sidewalls 162 of the pores 160 of the 3D porous cathode 110'. Further, as will be discussed below, solid electrolyte strands 150' formed in the porous cathode 110' by a sintering operation is densified during the sintering by the use of precursor materials during formation of the porous cathode 110' to provide enhanced ionically conducting pathways in the solid electrolyte strands 150'.

Figure 13D:
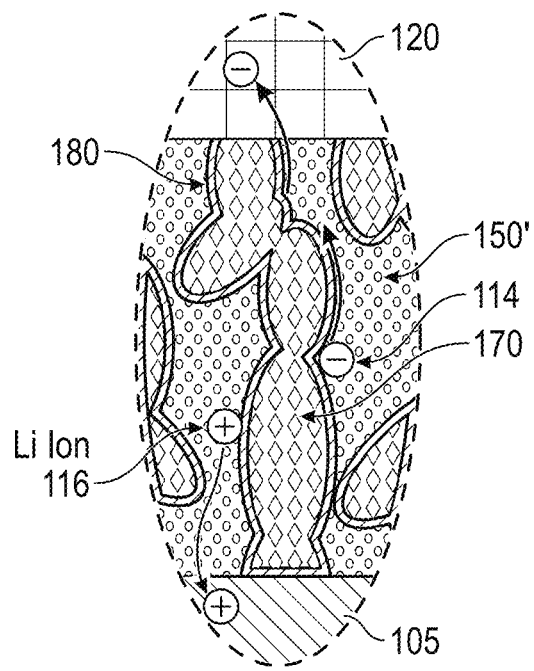
FIG. 13D is a close-up view of an exemplary pore in the cathode, showing electron and ion conduction with an electronically conducting network.

More specifically, as illustrated in FIGS. 13B-13D, electronically conducting material is introduced on the surface of the pore 160 to form electronically conducting network 180. The electronically conducting network 180 is electrically connected with the cathode current collector 120. Also, as will be discussed below, ionic conduction in the solid electrolyte strands 150' is enhanced by densification during formation of the pores 160 in the sintering process to provide enhanced ionically conducting pathways in the solid electrolyte strands 150'. In order to enhance densification, sintering aids can be added for this purpose. Alternatively or additionally, temperature and pressure during sintering can be adjusted to enhance densification of the solid electrolyte strands 150', with the target of providing a uniform high density throughout the solid electrolyte strands 150'. With these arrangements, when a cathode active material 170 is introduced in the pores 160, as shown in FIG. 13C, the cathode material 170 in each pore 160 is in direct contact with the electronically conducting network 180 and the ionically conducting network in the solid electrolyte strands 150'.

Referring to FIG. 13D, during charging of the battery 1300, lithium ions 116 are released from the cathode active material 170 everywhere throughout the pore 160, moving through the enhanced ionically conducting pathways in the solid electrolyte strands 150' toward the solid electrolyte separator 105, and, from here, transferring further to the anode 130. Simultaneously, electrons 114 are released from the cathode active material 170 everywhere throughout the pore 160, transferring to the electronically conducting network 180, and then to the cathode current collector 120, and further to the anode current collector 140 and the anode 130 through an external circuit (not shown). The presence of the electronically conducting networks 180 and the enhanced ionic conduction of the solid electrolyte strands 150' allows the entire cathode active material 170 to be functional, leading to high cathode utilization efficiency, high capacity and high energy density for the battery 1300, compared with the battery 1200 shown in FIG. 12A.

It is noted that the solid electrolyte strands 150' can be made of the same material as the material forming the electrolyte separator 105. It is further noted that the anode 130 can also be formed as a 3D porous anode as well, in the same manner as described herein for the 3D porous cathode 110', with electronically conducting networks on sidewalls of the pores and enhanced ionically conducting networks in the electrolyte strands formed between the pores of the anode 130. Also, similar to the case discussed above for the electrolyte strands 150' of the cathode structure 110', both the electrolyte separator 105 and the electrolyte strands in the anode 130 can be densified during sintering to enhance ionic conduction, as discussed above.

Referring to FIGS. 13A-13D, it is noted that the sidewalls 162 of the pores 160 are formed by edges of the solid-state ionically conducting electrolyte strands 150' that abut the pores 160 which extend between the solid-state ionically conducting electrolyte separator 105 and the cathode current collector 120 in the cathode structure 110'. Although the drawings show the pores 160 extending only vertically through the cathode structure 110', it is to be understood that portions of the pores 160 can extend horizontally through the cathode structure 110' as well, connecting the vertical portions of the pores 160 shown in FIGS. 13A to 13D to form a porous 3D cathode structure having pores extending in both vertical and horizontal directions.

The ionically conducting networks formed in the electrolyte strands 150' can comprise lithium ion conducting materials selected from a group consisting of borides, carbides, nitrides, phosphides, phosphates, sulfides, oxides, selenides, fluorides, chlorides, bromides, iodides, and combinations thereof. The most useful ionically conducting materials include oxides, sulfides, phosphates, and nitrides. More specifically, preferred ionically conducting materials can be selected from a group consisting of garnet structure oxides including lithium lanthanum zirconium oxide (LLZO) and LLZO with various dopants including aluminum, niobium, gallium, tantalum, and tungsten; phosphate glass ceramics such as lithium aluminum germanium phosphate (LAGP) and lithium aluminum titanium phosphate (LATP); sulfides such as thiophosphate and argyrodite; and lithium phosphorus oxynitride (LiPON). These ionically conducting materials can form both the solid electrolyte separator 105 and the electrolyte strands 150'.

The electronically conducting networks 180 can comprise electronically conducting materials selected from a carbon material, a metal, a semiconductor, a conducting polymer, an electron conductive ceramic or combinations thereof. The thickness of the electronically conducting networks 180 can be in a range from 0.01 um to 1 um. In some implementations, the electronically conducting networks 180 may partially cover the surface with a surface coverage of 30% to 70%, forming a randomly structured web or randomly structured mesh to allow access to the lithium ions.

Again referring to FIGS. 13A-13D, in some implementations, the ionically and electronically conducting networks can be formed from additional precursor materials incorporated into a second precursor material used to create the pores in the cathode structure 110', as will be described further hereinafter. For example, the ionically and electronically conducting networks are formed during sintering of a structure from precursors incorporated in the second precursor material used to create the 3D porous cathode structure. Ideally, a cathode active material 170 is introduced and co-sintered (or co-fired) with the ionically conducting and electronically conducting network materials if the cathode 110' is constructed of a cathode active material 170 that is stable under such sintering condition. For example, the cathode active material 170 would need to survive the sintering temperature for the ionically conducting materials (e.g., typically over 500° C.). Alternatively, the cathode material 170 can be incorporated into the pores 160 after the 3D porous cathode structure 110' is formed by sintering. Various approaches for incorporating the cathode active material 170 into the porous structure are described hereinafter.

In implementations, the electronically conducting networks 180 can be formed from first precursor materials incorporated in second precursor materials used to create the 3D porous cathode structure 110'. For example, these first precursor materials are transformed into electronically conductive coatings on the surface of the pores 160 when the pores are formed during sintering of a structure made with the second precursor materials.

In one example, the 3D porous cathode structure 110' is formed by a powder deposition process followed by sintering. A powder of a solid electrolyte material is mixed with a powder of a sacrificial pore forming material (e.g., the second precursor material) and a powder of an electronically conducting material precursor (e.g., the first precursor material). The mixed powder is deposited as a thin layer and fixed with a binder material by binder jet printing. The deposited powder structure is then sintered, wherein the solid electrolyte material is densified to form the ionically conducting networks in the solid electrolyte strands 150', the sacrificial pore forming material is gasified and removed from the structure forming the pores 160, and the electronically conducting material precursor is converted, in one implementation decomposing to form the electronically conducting networks 180. A third precursor material can be included to aid in densifying the solid electrolyte material to enhance the ion-conducting ability of the electrolyte material. Thereafter, the cathode active material 170 can be incorporated, in accordance with aspects of this disclosure. For example, the cathode active material 170 can comprise any one or more of the following materials: lithium cobalt oxide (LCO), lithium manganese oxide (LMO), lithium iron phosphate (LFP), lithium nickel manganese cobalt (NMC), lithium nickel cobalt aluminum oxide (NCA), lithium nickel manganese oxide (LNMO), lithium vanadium oxide (LVO), lithium iron disulfide, silver vanadium oxide, carbon monofluoride, copper oxide, sulfur, or combinations thereof.

In implementations, the electrolyte separator layer 105 can be in a green (non-sintered) state and can then be sintered together with the layer of mixed powder. There can be two build sequences for a multiple layer battery cell 1300 shown in FIG. 13A. The first sequence is deposition of each layer in the order of: anode current collector 140, porous anode 130, ceramic electrolyte separator 105, porous cathode 110' and cathode current collector 120. The second sequence is the reverse of the first sequence with deposition of each layer in the order of: cathode current collector 120, porous cathode 110', ceramic electrolyte separator 105, porous anode 130 and anode current collector 140. Layers 120 to 140 form a repeat unit of a multiple layer battery cell.

In other implementations, the 3D porous cathode structure 110' can be formed by a slurry or paste coating process followed by sintering. A slurry or paste is formulated by mixing a powder of a solid electrolyte material with a powder of a sacrificial pore forming material, an electronically conducting material precursor, a binder and a solvent. The slurry or paste is deposited as thin layer by a coating technique, such as tape casting, screen printing or slot-die coating. The coated structure is then dried and sintered, wherein the solid electrolyte material is densified to form the ionically conducting networks in the electrolyte strands 150', sacrificial pore forming material is gasified and removed from the structure, thereby forming the pores 160, and the electronically conducting material precursor is converted, in one implementation decomposing to form the electronically conducting networks 180. Preferably, the ceramic electrolyte separator 105 and the electrolyte strands 150' in the porous cathode structure comprise the same solid electrolyte material.

The pore size, shape and porosity of the 3D porous cathode 110' can be controlled by the size, shape and concentration of the pore forming material. The pore forming material can be an organic or inorganic material or combinations thereof. The electronically conducting material precursor can be an organic material or inorganic material or combinations thereof. In a particular implementation, a metal carbonate is used as both a pore forming material and an electronically conducting material precursor.

In some implementations, the electronically conducting networks 180 can be incorporated after the porous cathode structure is formed. In this case, the 3D porous cathode has at least one side open without a sealed wall (similar to the arrangement described above with regard to using a filling aperture 49 in the cathode receptive space 11 shown in FIGS. 2 and 9). The aperture or opening allows infusion of the electronically conducting materials into the porous structure to form the electronically conducting networks 180 on the sidewalls 162 of the pores 160.

In implementations, carbon can be infused to form the electronically conducting networks 180, where a thin layer of carbon is coated at the sidewall surfaces 162 of the pores 160. The carbon can be introduced from a carbon dispersion or a hydrocarbon precursor. In alternative implementations, a metal is infused to form the electronically conducting networks 180, where a thin layer of metal is coated at the sidewall surfaces 162 of the pores 160. The metal may be introduced from a metal particle dispersion or a metal-organic precursor.

In implementations, cathode active material 170 can be introduced in a form as catholyte comprising the cathode active material and a liquid electrolyte, wherein the catholyte is drawn into the cathode porous structure under the force of a vacuum and/or a pressure. Alternatively, the cathode active material 170 can be introduced in a form as a cathode slurry or paste comprising the cathode active material, a polymer binder and solvents, wherein the cathode slurry or paste is drawn into the cathode porous structure under the force of a vacuum and/or a pressure. For example, the vacuum or differential pressure can be in a range of $10^{-3}$ to 277 torr ($1.9 \times 10^{-5}$ to 5.35 psi). The porous cathode filled with the cathode slurry or paste can then be subjected to heat or radiation (e.g. infrared or UV) to remove the solvents and cure the binder.

In other implementations, cathode active materials are introduced in a form of a slurry into a cathode receptive space (such as discussed above with regard to the cathode receptive space 11 shown in FIG. 2), with the slurry including precursors for synthesizing the cathode active material 170. The precursor slurry can be drawn into the cathode porous structure under the force of a vacuum and/or a pressure. Once the porous cathode receptor is filled with the cathode precursor slurry and is subject to a cathode active material synthesis conditioning process to convert the precursors into the cathode active material 170. The precursors for lithium cobalt oxide (LCO) may include cobalt nitrate ($Co(NO_3)_2$), cobalt chloride ($CoCl_2$), lithium nitrate ($LiNO_3$), and lithium hydroxide (LiOH). The precursors for lithium nickel manganese cobalt (NMC) may include nickel sulfate ($NiSO_4$), manganese sulfate ($MnSO_4$), cobalt sulfate ($CoSO_4$), lithium carbonate ($Li_2CO_3$) and lithium hydroxide. The precursors for lithium nickel cobalt aluminum oxide (NCA) may include nickel sulfate ($NiSO_4$), lithium carbonate ($Li_2CO_3$), aluminum sulfate ($Al_2(SO_4)_3$) and lithium hydroxide. In further implementations, cathode active material can be introduced in a form as a molten liquid comprising the cathode active material 170, wherein the cathode active material is molten and is drawn into the cathode porous structure under the force of a vacuum and/or a pressure. The porous cathode is filled with the molten cathode active material, and is then cooled to solidify the cathode active material.

In the following, further features, characteristics and advantages of the instant application will be described by means of items:

Item 1: An electrochemical cell which includes a cathode, and anode, an electrolyte separator, comprised of a ceramic material, located between the cathode and the anode, and a cathode current collector, wherein the cathode is located between the cathode current collector and the electrolyte separator, and wherein the cathode comprises a three dimensional (3D) porous cathode structure including: ionically conducting electrolyte strands extending through the cathode from the cathode current collector to the electrolyte separator, pores extending through the cathode from the cathode current collector to the electrolyte separator, and an electronically conducting network extending on sidewall surfaces of the pores from the cathode current collector to the electrolyte separator.

Item 2: The electrochemical cell of item 1, wherein the electronically conducting network partially covers the sidewall surfaces of the pores.

Item 3: The electrochemical cell of items 1 or 2, wherein the electronically conducting network partially covers between 30-70% of a total of the sidewall surfaces of the pores.

Item 4: The electrochemical cell of any of items 1-3, wherein a thickness of the electronically conducting network is between 0.01 µm and 1.0 µm, and a diameter of each of the pores is less than 100 µm.

Item 5: The electrochemical cell of any of items 1-4, wherein a diameter of each of the pores is preferably less than 50 µm, less than 10 µm, and more preferably less than 5 µm.

Item 6: The electrochemical cell of any of items 1-5, wherein the electronically conducting network is comprised of at least one material selected from a group consisting of: a metal; a carbon material; a semiconductor material; a conducting polymer; and an electronically conducting ceramic or combinations thereof.

Item 7: The electrochemical cell of any of items 1-6, wherein the ionically conducting electrolyte strands comprise a lithium ion conducting material selected from a group consisting of borides, carbides, nitrides, phosphides, phosphates, sulfides, oxides, selenides, fluorides, chlorides, bromides, iodides, and combinations thereof.

Item 8: The electrochemical cell of any of items 1-7, wherein the electronically conducting network is comprised of a carbon material including at least one selected from a group consisting of carbon black, activated carbon, graphite, graphene, carbon fiber, carbon nanotubes, and combinations thereof.

Item 9: The electrochemical cell of any of items 1-8, wherein the electronically conducting network is comprised of at least one material selected from a group consisting of silver, aluminum, and nickel.

Item 10: The electrochemical cell of any of items 1-9, wherein the electronically conducting network and the ionically conducting electrolyte strands are formed from precursor materials incorporated into a sacrificial pore forming material used to create the pores in a solid electrolyte material formed on the electrolyte separator, wherein the sacrificial pore forming material is configured to decompose during formation of the pores in the solid electrolyte material, and wherein the precursor materials are configured to coat the sidewall surfaces of the pores with the electronically conducting network and to densify the solid electrolyte material to form the ionically conducting electrolyte strands upon completion of formation of the pores.

Item 11: The electrochemical cell of any of items 1-10, further comprising a cathode material in the pores, in direct contact with the ionically conducting electrolyte strands and the electronically conducting network.

Item 12: The electrochemical cell of any of items 1-11, wherein the cathode material is comprised of a material in which lithium ions are released from the cathode active material, during charging of the electrochemical cell, throughout the pores, to move through the electrolyte strands toward the electrolyte separator, and in which electrons are released from the cathode active material, during charging of the electrochemical cell, throughout the pores, to transfer to the electronically conducting network.

Item 13: A method for forming a 3D porous cathode structure for an electrochemical cell including a cathode, an anode, an electrolyte separator, comprised of a ceramic material, located between the cathode and anode, and a cathode current collector, wherein the cathode comprising the 3D porous cathode structure is located between the cathode current collector and the electrolyte separator, wherein the method includes mixing a first precursor material, a second precursor material and a third precursor material together to form a mixture, depositing the mixture as a layer where the cathode is to be formed, and sintering the mixture to form the 3D porous cathode structure with ionically conducting electrolyte strands extending through the cathode from the cathode current collector to the electrolyte separator, pores extending through the cathode from the cathode current collector to the electrolyte separator, and an electronically conducting network extending on sidewall surfaces of the pores from the cathode current collector to the electrolyte separator, wherein the second precursor material is a sacrificial material configured to decompose during formation of the pores in the solid electrolyte material by the sintering using the second precursor material, the first precursor material is a material which forms a coating of the electronically conducting network on the sidewall surfaces of the pores formed by sintering the second precursor material, and the third precursor material is a material that densifies the solid electrolyte material to form the ionically conducting electrolyte strands upon completion of formation of the pores.

Item 14: The method of item 13, wherein the mixture of the first, second and third precursor materials comprises a powder deposition mixture.

Item 15: The method of items 13 or 14, wherein the second precursor material is comprised of a powder of a sacrificial pore forming material.

Item 16: The method of any of items 13-15, wherein the powder deposition mixture is fixed with a binder material by a binder jet printing operation prior to the sintering.

Item 17: The method of any of items 13-16, wherein the mixture of the first, second and third precursor materials comprises a slurry including powders for the first, second and third precursor materials, a binder and a solvent.

Item 18: The method of any of items 13-17, further comprising depositing the slurry by a coating technique selected from a group consisting of tape casting, screen printing, slot-die coating, and inkjet printing.

Item 19: The method of any of items 13-18, wherein the first precursor material comprises a metal carbonate.

Item 20: The method of any of items 13-19, further comprising filling a cathode material in the pores, in direct contact with the electronically conducting network, wherein the cathode material is comprised of a material in which lithium ions are released from the cathode active material, during charging of the electrochemical cell, throughout the pores, to move through the electrolyte strands toward the electrolyte separator, and in which electrons are released from the cathode active material, during charging of the electrochemical cell, throughout the pores, to transfer to the electronically conducting network.

Item 21: A method for forming a 3D porous cathode structure for an electrochemical cell including a cathode, an anode, an electrolyte separator, comprised of a ceramic material, located between the cathode and anode, and a cathode current collector, wherein the cathode comprising a 3D porous cathode structure is located between the cathode current collector and the electrolyte separator, the method including depositing the mixture of a powder of solid electrolyte material, a powder of a sacrificial pore forming material, and a powder of a precursor for densifying the solid electrolyte material as a layer where the cathode is to be formed, sintering the mixture to form the 3D porous cathode structure with the ionically conducting network in the 3D porous cathode structure, infusing an electronically conducting material into the 3D porous cathode structure after the sintering, to coat sidewall surfaces of the pores to form the electronically conducting network, and forming a cathode material in the pores after coating of the sidewall surfaces of the pores with the electronically conducting material, wherein the electronically conducting network is configured to conduct electrons from the cathode material.

While some implementations have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular implementations only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An electrochemical cell comprising:
   a cathode;
   an anode;
   an electrolyte separator, the electrolyte separator comprising a ceramic material and located between the cathode and the anode; and
   an anode current collector, the anode being located between the anode current collector and the electrolyte separator;
   wherein the anode comprises a three dimensional (3D) porous anode structure including:
      ionically conducting electrolyte strands extending through the anode from the anode current collector to the electrolyte separator,
      pores extending through the anode from the anode current collector to the electrolyte separator, and
      an electronically conducting network extending on sidewall surfaces of the pores from the anode current collector to the electrolyte separator;
      wherein sidewalls of each pore extend from the anode current collector into the anode to form a channel between the anode current collector and the electrolyte separator;
   wherein the cathode is configured to fit precisely into a cathode receptive space.

2. The electrochemical cell of claim 1, wherein an upper portion of the cathode receptive space is bounded by a cathode current collector to contact an upper surface of the cathode.

3. The electrochemical cell of claim 1, wherein a lower portion of the cathode receptive space is bounded by the electrolyte separator.

4. The electrochemical cell of claim 1, wherein side portions of the cathode receptive space are bounded by ceramic walls.

5. The electrochemical cell of claim 4, wherein the ceramic walls comprise of solid-state electrolyte material.

6. The electrochemical cell of claim 4, wherein the ceramic walls surround at least 60% of side portions of the cathode receptive space.

7. The electrochemical cell of claim 1, wherein one side portion of the cathode receptive space includes an opening configured for inserting the cathode into the cathode receptive space.

8. The electrochemical cell of claim 7, further comprising a seal configured to seal the opening after the cathode has been inserted into the cathode receptive space.

9. The electrochemical cell of claim 1, wherein the cathode is configured to fill the cathode receptive space.

10. The electrochemical cell of claim 2, wherein the cathode current collector is comprised of at least one of a metal, a metal alloy, a conductive ceramic or a current conductive carbon based material.

11. An electrochemical cell comprising:
    a cathode;
    an anode;
    an electrolyte separator, the electrolyte separator comprising a ceramic material and located between the cathode and the anode; and
    an anode current collector, the anode being located between the anode current collector and the electrolyte separator; and
    wherein the anode comprises a three dimensional (3D) porous anode structure including:
       ionically conducting electrolyte strands extending through the anode from the anode current collector to the electrolyte separator,
       pores extending through the anode from the anode current collector to the electrolyte separator, and
       an electronically conducting network extending on sidewall surfaces of the pores from the anode current collector to the electrolyte separator;
       wherein sidewalls of each pore extend from the anode current collector into the anode to form a channel between the anode current collector and the electrolyte separator;
    wherein the cathode is a solid or semi-solid cathode comprising a cathode active material, an electrolyte for the charge transfer ion, and an electron conducting material; and
    wherein the solid or semi-solid cathode is inserted into a cathode receptive space of the electrochemical cell, and wherein the cathode is configured to precisely fit into the cathode receptive space.

12. The electrochemical cell of claim 11, wherein an upper portion of the cathode receptive space is bounded by a cathode current collector to contact an upper surface of the cathode.

13. The electrochemical cell of claim 11, wherein a lower portion of the cathode receptive space is bounded by the electrolyte separator.

14. The electrochemical cell of claim 11, wherein side portions of the cathode receptive space are bounded by ceramic walls.

15. The electrochemical cell of claim 14, wherein the ceramic walls comprise of solid-state electrolyte material.

16. The electrochemical cell of claim 14, wherein the ceramic walls surround at least 60% of side portions of the cathode receptive space.

17. The electrochemical cell of claim 11, wherein one side portion of the cathode receptive space includes an opening configured for inserting the cathode into the cathode receptive space.

18. The electrochemical cell of claim 17, further comprising a seal configured to seal the opening after the cathode has been inserted into the cathode receptive space.

19. The electrochemical cell of claim 11, wherein the cathode is configured to fill the cathode receptive space.

20. The electrochemical cell of claim 11, wherein the cathode current collector is comprised of at least one of a metal, a metal alloy, a conductive ceramic, and a current conductive carbon based material.

\* \* \* \* \*